United States Patent
Iwaya et al.

(10) Patent No.: US 9,499,361 B2
(45) Date of Patent: Nov. 22, 2016

(54) BELT CONVEYOR UNIT AND IMAGE FORMING APPARATUS INCLUDING SAME

(71) Applicants: Naoki Iwaya, Tokyo (JP); Masaharu Furuya, Kanagawa (JP); Yoshiki Hozumi, Kanagawa (JP); Yasufumi Takahashi, Kanagawa (JP)

(72) Inventors: Naoki Iwaya, Tokyo (JP); Masaharu Furuya, Kanagawa (JP); Yoshiki Hozumi, Kanagawa (JP); Yasufumi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/488,644

(22) Filed: Sep. 17, 2014

(65) Prior Publication Data

US 2015/0090564 A1 Apr. 2, 2015

(30) Foreign Application Priority Data

Sep. 27, 2013 (JP) .................................. 2013-200852

(51) Int. Cl.
| | | |
|---|---|---|
| *B65G 15/64* | (2006.01) | |
| *B65G 39/16* | (2006.01) | |
| *B65H 5/02* | (2006.01) | |
| *G03G 15/00* | (2006.01) | |

(52) U.S. Cl.
CPC ................ *B65H 5/021* (2013.01); *B65G 15/64* (2013.01); *B65G 39/16* (2013.01); *G03G 15/6529* (2013.01); *B65H 2404/253* (2013.01)

(58) Field of Classification Search
CPC ......... G03G 2215/00143; G03G 2215/00156; G03G 2215/00168; G03G 15/6529; G03G 15/1605; G03G 15/1615; B65H 5/021; B65G 15/64; B65G 39/16; B65G 39/071
See application file for complete search history.

(56) References Cited

U.S. PATENT DOCUMENTS

| | | | | |
|---|---|---|---|---|
| 8,733,542 B2* | 5/2014 | Yamaoka | ........... | G03G 15/1615 198/806 |
| 8,837,989 B2* | 9/2014 | Yasumoto | ............ | G03G 15/161 198/840 |
| 2006/0119029 A1* | 6/2006 | Kitamura | ............... | B41J 11/007 271/275 |
| 2013/0084110 A1* | 4/2013 | Fujioka | .............. | G03G 15/0194 399/312 |

(Continued)

FOREIGN PATENT DOCUMENTS

| | | |
|---|---|---|
| JP | 5-346746 | 12/1993 |
| JP | 2006-267243 | 10/2006 |
| JP | 2009-042355 | 2/2009 |
| JP | 2009-186910 | 8/2009 |

(Continued)

OTHER PUBLICATIONS

U.S. Appl. No. 14/140,097, filed Dec. 24, 2013.

(Continued)

*Primary Examiner* — Mark A Deuble (74) *Attorney, Agent, or Firm* — Oblon, McClelland, Maier & Neustadt, L.L.P.

(57) ABSTRACT

A belt conveyor unit includes a plurality of rollers around which a belt is entrained, including a first roller, a second roller disposed opposite the first roller via the belt, and a third roller other than the first roller and the second roller, and a belt alignment device including a shaft moving device to tilt a rotary shaft of the third roller upon receiving a moving force of the belt moving in a width direction of the belt in an axial direction of the rotary shaft to adjust displacement of the belt. The shaft moving device includes an axial-direction displacement member including a slanted surface that moves to a first side in the width direction of the belt along the rotary shaft upon receiving the moving force of the belt, and a fixation member to contact the slanted surface from the first side in the width direction of the belt.

9 Claims, 7 Drawing Sheets

(56) References Cited

U.S. PATENT DOCUMENTS

| | | | |
|---|---|---|---|
| 2013/0306440 A1* | 11/2013 | Asaoka | B65G 15/64 198/806 |
| 2013/0306441 A1 | 11/2013 | Asaoka et al. | |
| 2014/0008184 A1 | 1/2014 | Hozumi et al. | |
| 2014/0083821 A1 | 3/2014 | Hozumi et al. | |
| 2014/0183007 A1* | 7/2014 | Hozumi | G03G 15/1615 198/806 |

FOREIGN PATENT DOCUMENTS

| | | |
|---|---|---|
| JP | 2012-103286 | 5/2012 |
| JP | 2013-061374 | 4/2013 |

OTHER PUBLICATIONS

U.S. Appl. No. 14/507,087, filed Oct. 6, 2014.
U.S. Appl. No. 14/524,077, filed Oct. 27, 2014.

\* cited by examiner

IMMEDIATELY AFTER ASSEMBLY

FIG. 6

AFTER ADJUSTMENT

BELT CONVEYOR UNIT AND IMAGE FORMING APPARATUS INCLUDING SAME

CROSS-REFERENCE TO RELATED APPLICATIONS

This patent application is based on and claims priority pursuant to 35 U.S.C. §119 to Japanese Patent Application No. 2013-200852, filed on Sep. 27, 2013, in the Japan Patent Office, the entire disclosure of which is hereby incorporated by reference herein.

BACKGROUND

Technical Field

Exemplary aspects of the present invention generally relate to a belt conveyor unit and an image forming apparatus, such as a copier, a facsimile machine, or a printer including the belt conveyor unit.

Description of the Related Art

There has been known a color image forming apparatus using an electrophotographic method in which toner images of different colors formed on latent image bearing members are primarily transferred onto an intermediate transfer member and then onto a recording medium in a secondary transfer process.

There are two types of secondary transfer devices employed in the image forming apparatus of this kind: a roller-transfer type and a belt-transfer type. The secondary transfer device of the roller-transfer type includes an intermediate transfer member and a transfer roller, and a recording medium is interposed between the intermediate transfer member and the transfer roller, and conveyed. The latent image is secondarily transferred onto the recording medium while the recording medium is conveyed. The secondary transfer device of the belt-transfer type includes a secondary belt entrained around and stretched taut between the rollers. A recording medium is interposed between the secondary transfer belt and the intermediate transfer member, and the latent image is secondarily transferred onto the recording medium while the recording medium is conveyed.

In the secondary transfer device of the belt-transfer type, the recording medium is interposed in a secondary transfer nip between the secondary transfer belt and the intermediate transfer member, and the recording medium is absorbed to the secondary transfer belt upstream and/or downstream from the secondary transfer nip. In this configuration, the recording medium is held and conveyed reliably, not only at the secondary transfer nip, but also at the upstream side and the downstream side in the conveyance direction of the recording medium. Thus, it is generally said that the belt-transfer type allows more reliable sheet conveyance than the roller-transfer type.

Although advantageous, similar to a generally-known belt conveyor unit, the belt transfer method may cause the secondary transfer belt to travel to one side in the width direction of the belt or repeatedly wander back and forth on either side in the width direction of the belt.

Such belt wander and belt meander are attributed to dimensional tolerances of parts constituting the secondary transfer device, for example, variations in a parallelism error of rotary shafts of the plurality of rollers that supports the secondary transfer belt, variations in an outer diameter of the rollers, and variations in the tension of the secondary transfer belt due to changes in the circumferential length of the secondary transfer belt itself.

More specifically, because of the reasons above, the secondary transfer belt does not travel linearly, but keeps traveling out of alignment in the direction of displacement of the roller shaft (i.e., the width direction of the belt). In particular, in a case in which the secondary transfer device is relatively small, since the distance between the shafts of rollers is relatively short, the dimensional tolerance of the rollers easily affects the frequency of the belt wander. Therefore, there is demand for prevention of the belt wander.

One example of a known belt alignment device includes a guide rib provided at both ends of an inner circumferential surface of the belt in the width direction of the belt. In the known belt alignment device, when the belt runs off center in the width direction of the belt, the guide ribs come into contact with the end surface of the roller around which the belt is entrained, preventing the belt from traveling further in the width direction of the belt.

Another example of the belt alignment device is a steering-roller type belt alignment device in which a steering roller which is one of a plurality of rollers around which the belt is entrained is tiltably disposed relative to the main body. The belt alignment device of this kind includes a belt deviation detector. When the belt deviation detector detects the belt wandering off its track, the steering roller is tilted by a drive force from a drive source such as a motor to move the belt in the direction opposite the direction of the belt wander.

There is a drawback in the belt alignment device using the guide rib in that the width of the secondary transfer belt needs to be wider than the width of all rollers around which the secondary transfer belt is entrained in consideration of the guide rib disposed at both ends of the belt in the width direction of the belt, complicating efforts to achieve downsizing.

However, the width of the secondary transfer belt wider than the width of the transfer roller in the axial direction thereof causes the following drawback. That is, when the secondary transfer belt passes through the secondary transfer nip, the secondary transfer belt is pushed against the edge portion of the transfer roller by the intermediate transfer member. As a result, buckling load that causes the end portion of the secondary transfer belt in the width direction thereof to buckle is applied to the secondary transfer belt. Consequently, every time the secondary transfer belt passes through the secondary transfer nip, the buckling load is applied to the secondary transfer belt, damaging the secondary transfer belt and shortening the product life cycle of the secondary transfer belt.

By contrast, the width of the secondary transfer belt of the belt alignment device using the steering roller can be shorter than the width of rollers in the axial direction because no guide ribs need to be disposed at both ends of the secondary transfer belt in the direction of the width thereof. This configuration may prevent the buckling load from being applied to the secondary transfer belt when the secondary transfer belt passes through the secondary transfer nip, thereby enhancing the product life cycle of the secondary transfer belt.

However, this configuration requires the drive source that tilts the steering roller and the space for the drive source. Furthermore, reducing the width of the secondary transfer belt simply shorter than the width of the transfer roller does not prevent the end portion of the secondary transfer belt in the width direction from running off the edge portion of the transfer roller when the belt travels out of alignment.

In view of the above, there is demand for an image forming apparatus that enhances the product life of the belt without increasing the size of the apparatus.

SUMMARY

In view of the foregoing, in an aspect of this disclosure, there is provided an improved belt conveyor unit including a belt, a plurality of rollers around which the belt is rotatably entrained, and a belt alignment device. The belt is formed into an endless loop. The plurality of rollers includes at least a first roller, a second roller disposed opposite the first roller via the belt, and a third roller other than the first roller and the second roller. The belt alignment device includes a shaft moving device to tilt a rotary shaft of the third roller upon receiving a moving force of the belt moving in a width direction of a belt in an axial direction of the rotary shaft to adjust displacement of the belt within a permissible range. The shaft moving device includes an axial-direction displacement member and a fixation member. The axial-direction displacement member is disposed at the end of the rotary shaft of the third roller and moves to a first side in the width direction of the belt along the rotary shaft of the third roller upon receiving the moving force of the belt moving in the width direction of the belt. The axial-direction displacement member includes a slanted surface. The fixation member contacts the slanted surface of the axial-direction displacement member from the first side in the width direction of the belt. As the axial-direction displacement member receives the moving force of the belt moving in the width direction of the belt and moves in accordance with the slanted surface relative to the fixation member, the end of the rotary shaft of the third roller is displaced so as to tilt the rotary shaft of the third roller. A maximum amount of belt displacement in the width direction of the belt is adjusted by the axial-direction displacement member such that the maximum amount of belt displacement is substantially the same as a width of the slanted surface in the width direction of the belt, and the following relation is satisfied:

$$Z>2X+Y,$$

where X is the maximum amount of the belt displacement on one side in the width direction of the belt, Y is a width of the belt in an axial direction of the rotary shaft, and Z is a width of the second roller in the width direction of the belt.

In an aspect of this disclosure, there is provided an image forming apparatus including an image bearing belt, an image forming device, and the belt conveyor unit to drive the image bearing unit. The image bearing belt bears an image on a surface thereof. The image forming device forms the image on the image bearing belt.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

Figure 2:
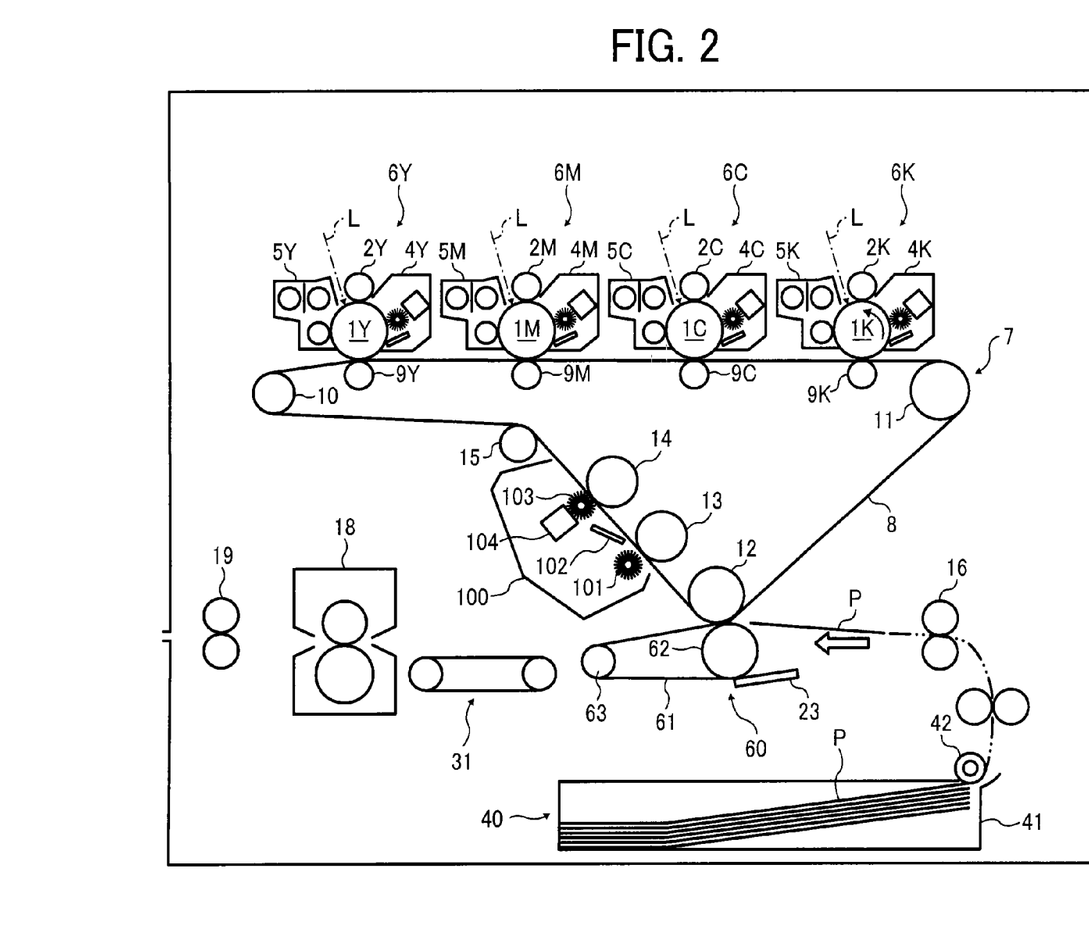
FIG. 2 is a schematic diagram illustrating an image forming apparatus according to an illustrative embodiment of the present disclosure.

With reference to FIG. 2, a description is provided of a tandem-type printer using an intermediate transfer method as an example of an electrophotographic image forming apparatus according to an illustrative embodiment of the present disclosure.

FIG. 2 is a schematic diagram illustrating the image forming apparatus.

The printer includes four processing units 6Y, 6M, 6C, and 6K that form toner images of yellow, magenta, cyan, and black, respectively. The processing units 6Y, 6M, 6C, and 6K include drum-shaped photosensitive members (hereinafter referred to simply as photosensitive drums) 1Y, 1M, 1C, and 1K, respectively.

Chargers 2Y, 2M, 2C, and 2K, development devices 5Y, 5M, 5C, and 5K, cleaning devices 4Y, 4M, 4C, and 4K, and charge neutralizers are respectively disposed around the photosensitive drums 1Y, 1M, 1C, and 1K.

The processing units 6Y, 6M, 6C, and 6K all have the same configuration as all the others, differing only in the color of toner employed. It is to be noted that the suffixes Y, M, C, and K denote colors yellow, magenta, cyan, and black, respectively. To simplify the description, the suffixes Y, M, C, and K indicating colors are omitted herein, unless otherwise specified.

An optical writing unit that projects laser light beams L to write electrostatic latent images on the photosensitive drums 1Y, 1M, 1C, and 1K is disposed above the processing units 6Y, 6M, 6C, and 6K.

A transfer unit 7 is disposed below the processing units 6Y, 6M, 6C, and 6K. The transfer unit 7 includes an intermediate transfer belt 8 formed into an endless loop.

The transfer unit 7 further includes a plurality of tension rollers disposed inside the loop of the intermediate transfer belt 8, a tension roller 15, a belt cleaning device 100, and so forth. The tension roller 15 and the belt cleaning device 100 are disposed outside the loop of the intermediate transfer belt 8.

Inside the loop of the intermediate transfer belt 8, four primary transfer rollers 9Y, 9M, 9C, and 9K, a driven roller 10, a drive roller 11, a secondary-transfer opposed roller 12, a cleaning-brush opposed roller 13, and an application-brush opposed roller 14 are disposed. The intermediate transfer belt 8 is entrained around each of these rollers and stretched taut. These rollers function as tension rollers.

The cleaning-brush opposed roller 13 and the application-brush opposed roller 14 do not necessarily apply a certain tension to the intermediate transfer belt 8 and may be driven to rotate along with rotation of the intermediate transfer belt 8.

The drive roller 11 is driven to rotate clockwise in FIG. 2 by a drive motor, and the intermediate transfer belt 8 is driven to endlessly move clockwise in FIG. 2 by the rotation of the drive roller 11.

The intermediate transfer belt 8 is interposed between the primary transfer rollers 9Y, 9M, 9C, and 9K disposed inside the looped intermediate transfer belt 8 and the photosensitive drums 1Y, 1M, 1C, and 1K. The place where the peripheral surface or the front surface (image bearing surface) of the intermediate transfer belt 8 and the photosensitive drums 1Y, 1M, 1C, and 1K contact is a so-called primary nip.

A primary transfer bias having a polarity opposite to a normal charge polarity of toner is applied to the primary transfer rollers 9Y, 9M, 9C, and 9K by a power source.

The intermediate transfer belt 8 and a secondary transfer belt 61 are interposed between the secondary-transfer opposed roller 12 disposed inside the looped intermediate transfer belt 8 and a secondary transfer roller 62 disposed outside the looped intermediate transfer belt 8. The place where the peripheral surface of the intermediate transfer belt 8 and the secondary transfer belt 61 contact is a so-called a secondary transfer nip.

According to the present illustrative embodiment, the secondary transfer belt 61 is supported by two axes, i.e., the secondary transfer roller 62 and a separation roller 63. Pressurization and depressurization of the secondary transfer roller 62 against the intermediate transfer belt 8 are controlled by a pressing device. When a recording medium P is conveyed during an image forming operation, the secondary transfer roller 62 is pressed by the pressing device so that the secondary-transfer opposed roller 12 and the secondary transfer roller 62 form the secondary transfer nip.

The power source applies the secondary-transfer opposed roller 12 a secondary transfer bias having the same polarity as the normal charge polarity of toner, and the secondary transfer roller 62 is electrically grounded. As the secondary transfer roller 62 is grounded, electrical leakage to surrounding parts and devices due to high voltage is difficult to occur.

Figure 3:
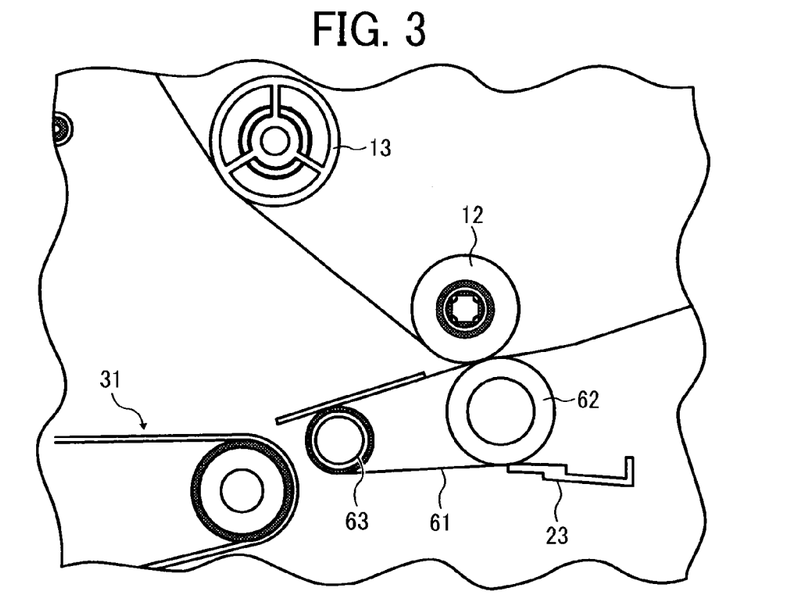
FIG. 3 is a partially enlarged schematic diagram illustrating a secondary transfer device employed in the image forming apparatus of FIG. 2 and a structure near the secondary transfer device.
Figure 4:
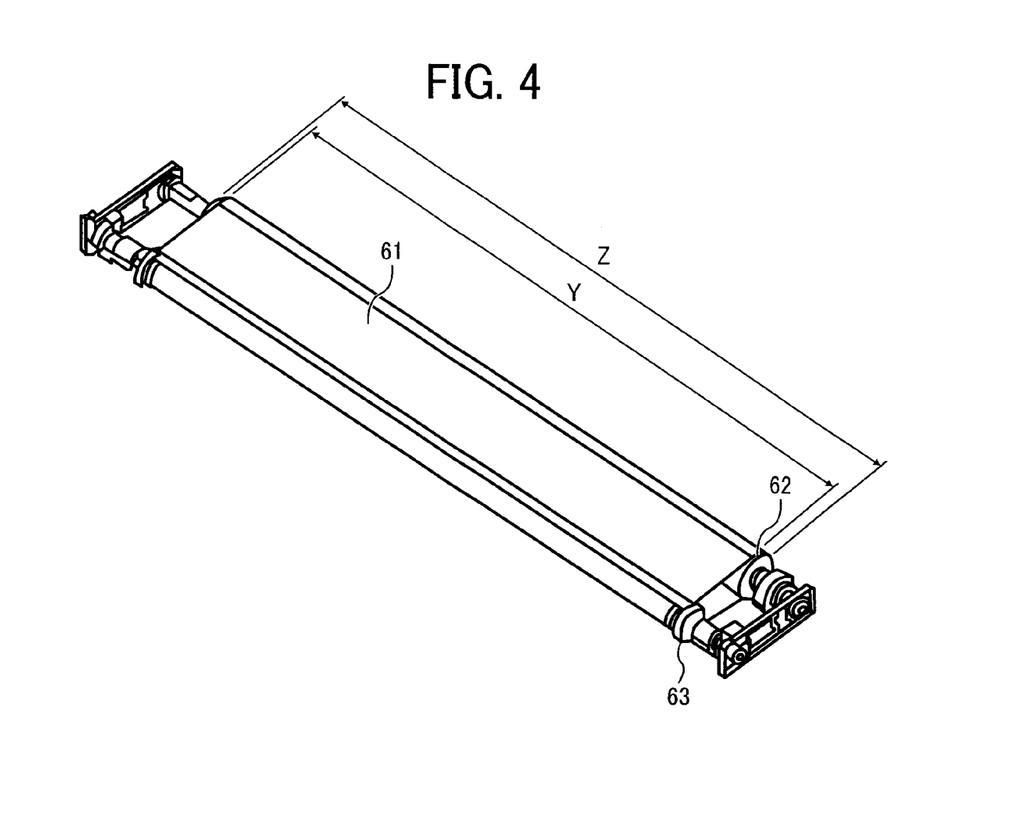
FIG. 4 is a perspective view schematically illustrating the secondary transfer device.

FIG. 3 is a partially enlarged schematic diagram illustrating a secondary transfer device 60 employed in the image forming apparatus and a structure near the secondary transfer device 60. FIG. 4 is a perspective view schematically illustrating the secondary transfer device 60.

Substantially below the transfer unit 7, the secondary transfer device 60 is disposed. In the secondary transfer device 60, the secondary transfer belt 61 formed into an endless loop is rotatably entrained around and stretched taut between the secondary transfer roller 62 and the separation roller 63.

A cleaning blade 23 contacts the peripheral surface or the front surface of the looped secondary transfer belt 61 opposite the secondary transfer roller 62. Substances such as residual toner and paper dust adhered to the front surface of secondary transfer belt 61 are removed by the belt cleaning blade 23 in preparation for the subsequent imaging cycle.

The secondary transfer roller 62 is driven by a drive motor as a drive source, causing the secondary transfer belt 61 to rotate.

The secondary transfer belt 61 may be rotated by the rotation of the intermediate transfer belt 8. However, when the recording medium P passes through the secondary transfer nip, the driving force is difficult to transmit from the intermediate transfer belt 8 to the secondary transfer belt 61. As a result, the speed of the secondary transfer belt 61 fluctuates easily.

The recording medium P onto which the toner image is transferred from the intermediate transfer belt 8 at the secondary transfer nip is absorbed electrostatically to the secondary transfer belt 61 and conveyed.

A sheet conveyor 31 is disposed downstream from the secondary transfer belt 61 in the direction of conveyance of the recording medium P. The recording medium P electrostatically absorbed to the secondary transfer belt 61 separates from the secondary transfer belt 61 by self-stripping at the separation roller 63 and is conveyed to the sheet conveyor 31.

A belt cleaning device 100 includes a cleaning brush roller 101 and an application brush roller 103. The cleaning brush roller 101 and the application brush roller 103 of the belt cleaning device 100 are disposed outside the belt loop, facing the cleaning-brush opposed roller 13 and the application-brush opposed roller 14, respectively. The intermediate transfer belt 8 is interposed between the cleaning-brush opposed roller 13 and the application-brush opposed roller 14, and the cleaning brush roller 101 and the application brush roller 103. Accordingly, a cleaning nip is formed at a place where the cleaning brush roller 101 and the application brush roller 103 contact the front surface of the intermediate transfer belt 8.

The belt cleaning device 100 is for cleaning the intermediate transfer belt 8. The belt cleaning device 100 includes the cleaning brush roller 101 formed of polyethylene terephthalate (PET) fibers and a cleaning blade 102 formed of urethane rubber. The cleaning brush roller 101 and the cleaning blade 102 are disposed outside the looped intermediate transfer belt 8 and contact the front surface of the intermediate transfer belt 8.

The residual toner and paper dust remaining on the intermediate transfer belt 8 after secondary transfer are removed by the cleaning brush roller 101. Subsequently, the cleaning blade 102 disposed downstream from the cleaning brush roller 101 in the direction of travel of the intermediate transfer belt 8 removes the toner and the paper dust still remaining on the surface of the intermediate transfer belt 8.

Downstream from the cleaning blade 102 in the direction of travel of the intermediate transfer belt 8, the application brush roller 103 contacts the front surface of the intermediate transfer belt 8 to apply a lubricant 104 to the surface of the intermediate transfer belt 8.

The belt cleaning device 100 is replaceable together with the intermediate transfer belt 8. In a case in which the belt cleaning device 100 and the intermediate transfer belt 8 have different product life cycles, the belt cleaning device 100 may be detachably attachable relative to the main body of the image forming apparatus, independent of the intermediate transfer belt 8.

The image forming apparatus of the present illustrative embodiment includes a sheet feeding unit 40 equipped with a sheet cassette 41 and a sheet feed roller 42. The sheet cassette 41 stores a stack of recording media P. The sheet feed roller 42 feeds the recording media P to a sheet passage.

A pair of registration rollers 16 is disposed upstream from the secondary transfer nip in the direction of conveyance of the recording medium P. The pair of registration rollers 16 receives the recording medium P from the sheet feeding unit 40 and feeds it to the secondary transfer nip in appropriate timing.

A fixing device 18 is disposed downstream from the sheet conveyor 31 in the direction of conveyance of the recording medium P. In the fixing device 18, heat and pressure are applied to the toner image on the recording medium P delivered from the sheet conveyor 31, and the toner image is fixed onto the recording medium P. After the fixing process, the recording medium P is discharged outside the image forming apparatus by a pair of sheet output rollers 19 disposed downstream from the fixing device 18.

The image forming apparatus includes toner supply devices that supply toners of yellow, magenta, cyan, and black to the respective development devices 5Y, 5M, 5C, and 5K, if necessary.

The intermediate transfer belt 8 includes a single layer or multiple layers including, but not limited to, polyimide (PI), polyvinylidene fluoride (PVDF), ethylene tetrafluoroethylene (ETFE), and polycarbonate (PC). The volume resistivity is adjusted by dispersing conductive material such as carbon black. More specifically, the volume resistivity is adjusted to be in a range from $10^8$ Ω·cm to $10^{12}$ Ω·cm, and the surface resistivity is adjusted to be in a range from $10^9$ Ω·cm and $10^{13}$ Ω·cm.

The intermediate transfer belt 8 may include a release layer on the surface thereof. The release layer may include, but is not limited to, fluorocarbon resin such as ETFE, polytetrafluoroethylene (PTFE), PVDF, perfluoroalkoxy polymer resin (PFA), fluorinated ethylene propylene (FEP), and polyvinyl fluoride (PVF).

The intermediate transfer belt 8 is manufactured through a casting process, a centrifugal casting process, and the like. The surface of the intermediate transfer belt 8 may be ground as necessary.

If the volume resistivity of the intermediate transfer belt 8 exceeds the above range, a necessary bias for transfer increases, hence increasing the cost of the power source. In the transfer and the sheet stripping process, the electrical potential of the intermediate transfer belt 8 increases, and self discharge becomes difficult. Thus, a charge removing device is necessary.

If the volume resistivity and the surface resistivity are below the above-described range, attenuation of the electrical potential accelerates, which is advantageous in removing charge by self discharge. However, electric current flows in the surface direction upon transfer, causing the toner to scatter.

Therefore, the volume resistivity and the surface resistivity are within the above range.

The volume resistivity and the surface resistivity of the intermediate transfer belt 8 are measured as follows. The volume resistivity and the surface resistivity can be measured by connecting an HRS Probe having an inner electrode diameter of 5.9 mm and a ring caliber of 11 mm to a high resistivity meter, Hiresta IP, (Mitsubishi Chemical, Ltd). The volume resistivity is calculated after 10 seconds elapses when a voltage of 100 V (for the surface resistivity, a voltage of 500 V) is applied to both sides of the intermediate transfer belt 8.

In order to facilitate cleaning of the intermediate transfer belt 8 by the belt cleaning device 100, the lubricant 104 is applied to the surface of the intermediate transfer belt 8 by the application brush roller 103. The lubricant 104 is pressed against the application brush roller 103 by a pressing member including an elastic member such as a spring to scrape the lubricant 104 by the application brush roller 103.

As the lubricant 104, fatty acid metal salt having a linear hydrocarbon chain is employed.

The fatty acid metal salt includes fatty acid including at least one of stearic acid, palmitic acid, myristic acid, and oleic acid, and metal including at least one of zinc, aluminum, calcium, magnesium, and lithium.

In particular, zinc stearate is preferable because zinc stearate is mass-produced in an industrial scale and has been used successfully. In other words, the zinc stearate is preferable because of its cost, stable quality, and reliability.

Generally, higher fatty acid metal salt used industrially is not a composition of the higher fatty acid metal salt alone. The higher fatty acid metal salt includes, more or less, similar fatty acid metal salt, metal oxide, and free fatty acid. The fatty acid metal of the present disclosure is no exception.

The lubricant 104 is supplied to the surface of the intermediate transfer belt 8 little by little in a powder form. More specifically, there are different ways in which the lubricant 104 is supplied to the surface of the intermediate transfer belt 8. For example, the lubricant 104 in a form of a solid block is scraped by the application brush roller 103 and applied to the surface of the intermediate transfer belt 8, or the lubricant 104 is added to toner and supplied.

In a case in which the lubricant 104 is added to the toner and supplied to the intermediate transfer belt 8, the supply amount depends on an area of image to be output and the lubricant cannot be supplied to an entire surface of the intermediate transfer belt 8. In view of the above, when supplying the lubricant 104 to the entire surface of the intermediate transfer belt 8 by a simple structure, the application brush roller 103 that scrapes the lubricant 104 is suitable such as in the present illustrative embodiment.

Similar to a generally known belt conveyor, in the configuration similar to the secondary transfer device 60, the secondary transfer belt 61 tracks off over time, and it is very difficult to prevent the belt wander completely.

The mechanism of misalignment of the secondary transfer belt 61 is explained below. The belt wander is caused by dimensional tolerance of parts constituting the secondary transfer device 60, for example, variations in a parallelism error of rotary shafts of the secondary transfer roller 62 and the separation roller 63 around which the secondary transfer belt 61 is entrained, variations in the outer diameter of the rollers, and variations in the tension of the secondary transfer belt due to changes in the circumference of the secondary transfer belt itself.

Next, a description is provided of a belt alignment device of the secondary transfer device 60 equipped with the secondary transfer belt 61.

A shaft moving device 70 serves as the belt alignment device of the secondary transfer device 60 to tilt the rotary shaft of the separation roller 63 around which the secondary transfer belt 61 is entrained so as to restrict the range of misalignment of the secondary transfer belt 61 within a predetermined permissible range.

Figure 1:
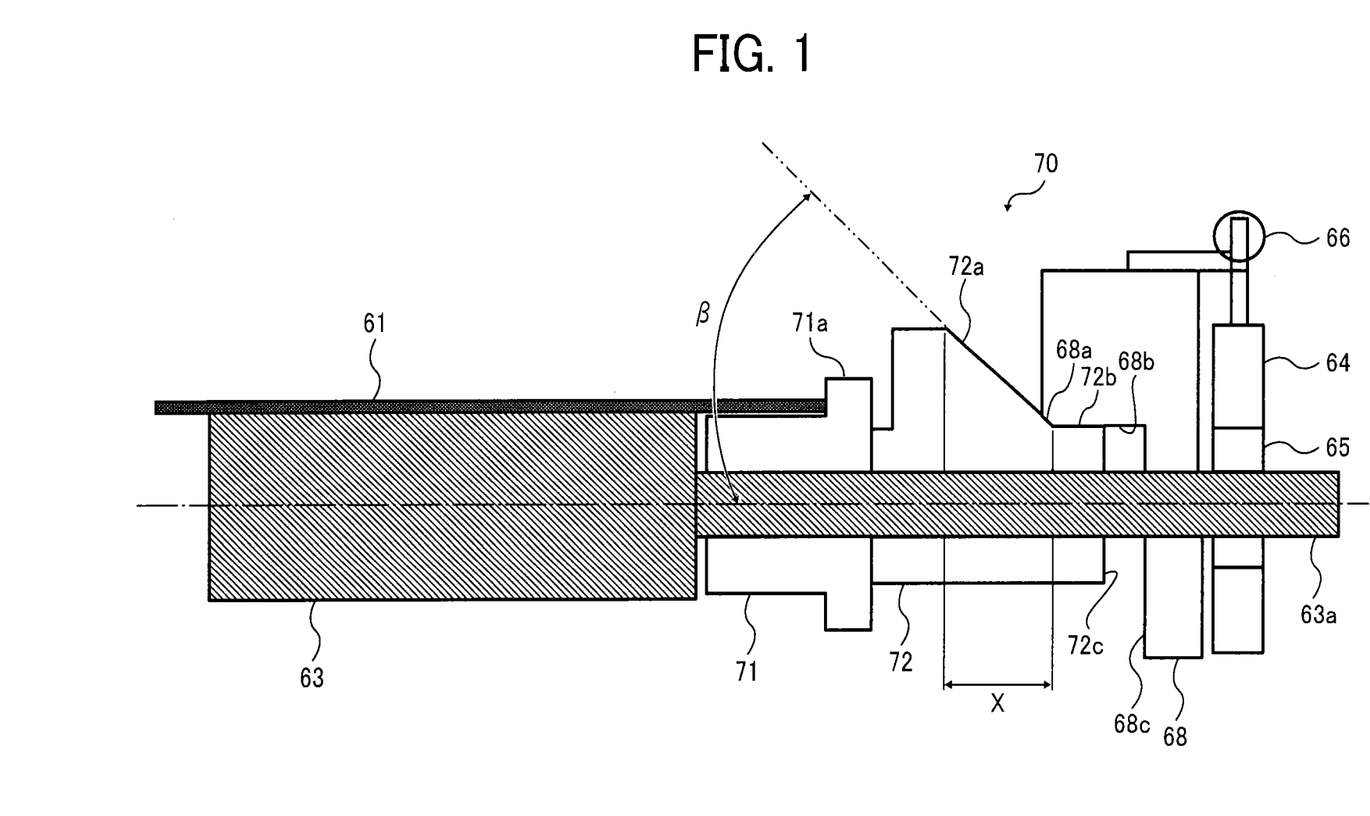
FIG. 1 is a cross-sectional diagram schematically illustrating a shaft moving device, taken along a rotary shaft of a separation roller immediately after assembly.

FIG. 1 is a cross-sectional diagram schematically illustrating the shaft moving device 70 of the secondary transfer device 60, cut along the rotary shaft 63a of the separation roller 63.

Figure 5:
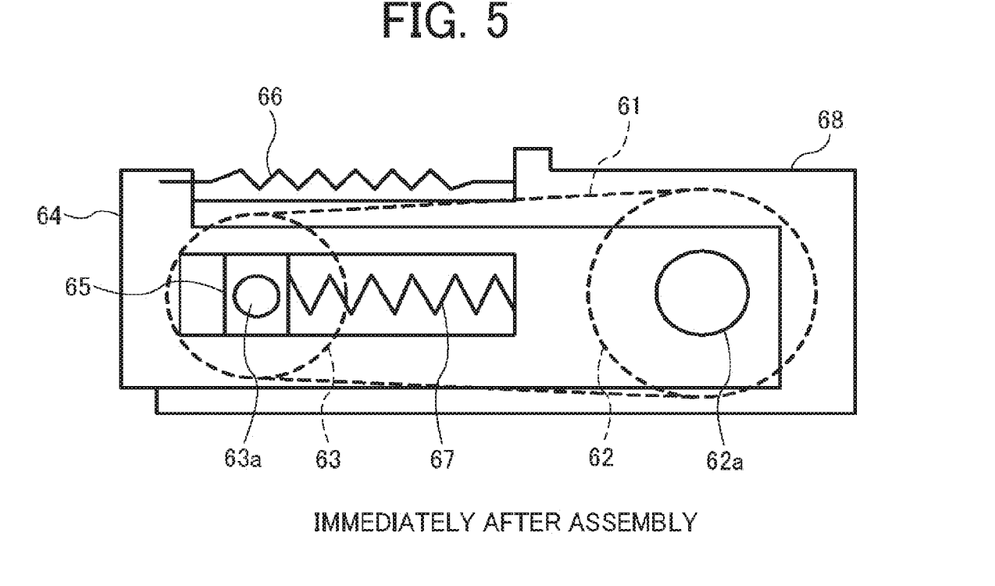
FIG. 5 is a schematic diagram illustrating the shaft moving device immediately after assembly as viewed in an axial direction of the separation roller.

FIG. 5 is a schematic diagram illustrating the shaft moving device 70 immediately after assembly as viewed in an axial direction of the separation roller 63.

Figure 6:
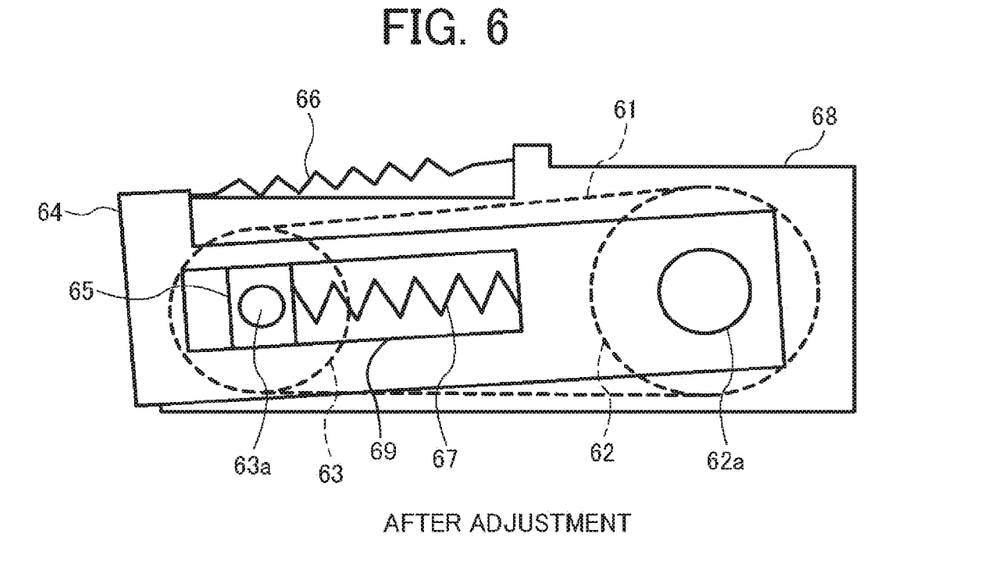
FIG. 6 is a schematic diagram illustrating the shaft moving device after adjustment of misalignment of a secondary transfer belt as viewed in the axial direction of the separation roller.

FIG. 6 is a schematic diagram illustrating the shaft moving device 70 after adjustment of misalignment of the secondary transfer belt 61 as viewed in the axial direction of the separation roller 63.

Each end of a rotary shaft 63a of the separation roller 63 is supported individually by different support arms 64. Each support arm 64 is rotatably attached to each end of a rotary shaft 62a of the secondary transfer roller 62 and biased in a clockwise direction in FIG. 5 by an arm spring 66 with one end thereof fixed to a frame 68 of the secondary transfer device 60.

In a state in which there is no wandering of the secondary transfer belt 61 immediately after assembly, a rotation position of the support arms 64 is maintained at a position at which the support arms 64 contact the frame 68 due to a bias force of the arm spring 66.

As illustrated in FIGS. 5 and 6, each support arm 64 slidably supports a shaft bearing 65 that slides in groove 69 and bears the rotary shaft 63a of the separation roller 63 such that the shaft bearing 65 is slidable in a radial direction from the center of rotation of the support arm 64.

The shaft bearing 65 is biased by a tension spring 67 in the radial direction from the center of rotation of the support arms 64 towards outside. With this configuration, the separation roller 63 is always biased in such a direction that the separation roller 63 separates from the secondary transfer roller 62. Accordingly, a certain tension is applied to the secondary transfer belt 61 entrained around the separation roller 63 and the secondary transfer roller 62.

A belt deviation detector 71 and a shaft inclining member 72 are disposed on the rotary shaft 63a between the separation roller 63 and the shaft bearing 65. The belt deviation detector 71 and the shaft inclining member 72 constitute an axial-direction displacement device. The belt deviation detector 71 includes a flange 71a that contacts an end portion of the secondary transfer belt 61.

As the secondary transfer belt 61 moves in the width direction of the belt and the end portion thereof contacts the flange 71a, exerting a force on the belt deviation detector 71, the belt deviation detector 71 moves in the axial direction along the rotary shaft 63a of the separation roller 63. As the belt deviation detector 71 moves outward in the axial direction along the rotary shaft 63a, the shaft inclining member 72 which is disposed outside the belt deviation detector 71 on the rotary shaft 63a moves outward in the axial direction along the rotary shaft 63a.

A contact portion 68a of the frame 68 serving as a fixation member contacts a slanted surface 72a of the shaft inclining member 72 from outside the rotary shaft 63a in the axial direction.

The end portion of the rotary shaft 63a of the separation roller 63 on which the shaft inclining member 72 is disposed is supported via the shaft bearing 65 by the support arm 64 which is biased by the arm spring 66. Thus, the end portion of the rotary shaft 63a is biased upward in FIG. 1.

Accordingly, in a state in which the end portion of the secondary transfer belt 61 is not in contact with the flange 71a of the belt deviation detector 71, the contact position at which the contact portion 68a of the frame 68 and the slanted surface 72a of the shaft inclining member 72 contact is regulated at a position at which a first stopper surface 68b of the frame 68 contacts a contact surface 72b of the shaft inclining member 72 due to the spring force of the arm spring 66. The contact surface 72b of the shaft inclining member 72 is continuously formed at the lower end of the slanted surface 72a.

That is, the contact portion 68a of the frame 68 is held in a state in which the contact portion 68a contacts the lower end portion of the slanted surface 72a of the shaft inclining member 72.

In this state, the secondary transfer belt 61 receives a force causing the secondary transfer belt 61 to move in the width direction of the belt, thereby moving the belt deviation detector 71 and the shaft inclining member 72 outward in the axial direction along the rotary shaft 63a. As a result, the contact portion 68a relatively moves along the slanted surface 72a of the shaft inclining member 72.

Figure 7:
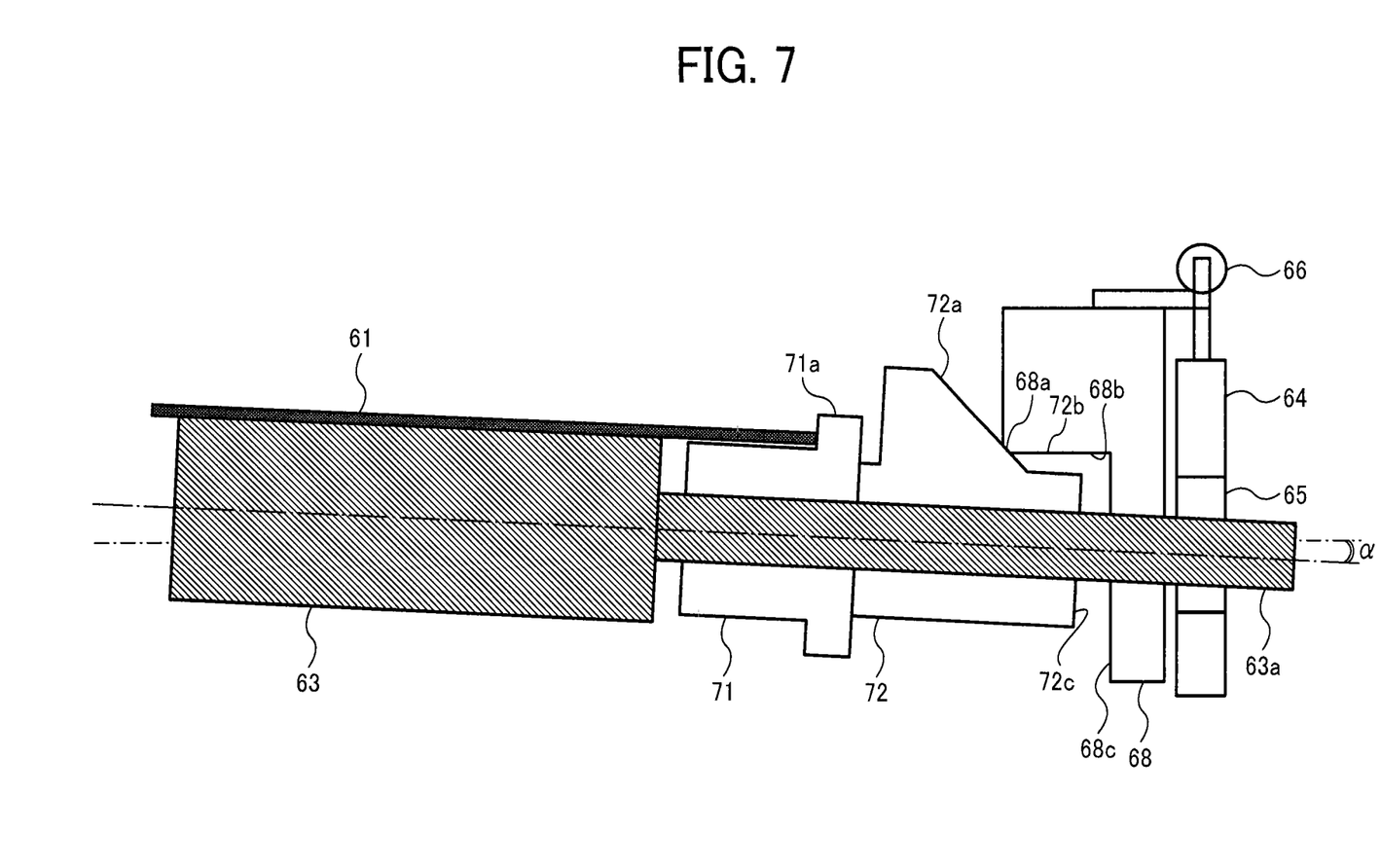
FIG. 7 is a cross-sectional diagram schematically illustrating the shaft moving device, taken along the rotary shaft of the separation roller after adjustment of misalignment of the secondary transfer belt.

The contact position at which the slanted surface 72a of the shaft inclining member 72 contacts the contact portion 68a of the frame 68 moves up towards the upper portion of the slanted surface 72a. As a result, the axial end portion of the rotary shaft 63a of the separation roller 63 in the direction of travel of the secondary transfer belt 61 is pressed down against the spring force of the arm spring 66 as illustrated in FIG. 7.

At this time, the end portion of the secondary transfer belt 61 is not in contact with the flange 71a of the belt deviation detector 71. Accordingly, as illustrated in FIG. 1, the contact portion 68a of the frame 68 is held in a state in which the contact portion 68a of the frame 68 contacts the lower end portion of the slanted surface 72a of the shaft inclining member 72.

The opposite end of the rotary shaft 63a of the separation roller 63, which is the opposite end in the direction of travel of the secondary transfer belt 61, is pressed down relative to the other end, causing the rotary shaft 63a to tilt.

As the rotary shaft 63a of the separation roller 63a tilts further, the traveling speed of the secondary transfer belt 61 in the width direction of the belt slows down gradually, and ultimately the secondary transfer belt 61 moves in the opposite direction in the width direction of the belt.

As a result, the position of the secondary transfer belt 61 in the width direction returns gradually, thereby enabling the secondary transfer belt 61 to run reliably at a position at which the secondary transfer belt 61 is aligned. The same is true for the case in which the direction of shift of the secondary transfer belt 61 is in the opposite direction.

Figure 8:
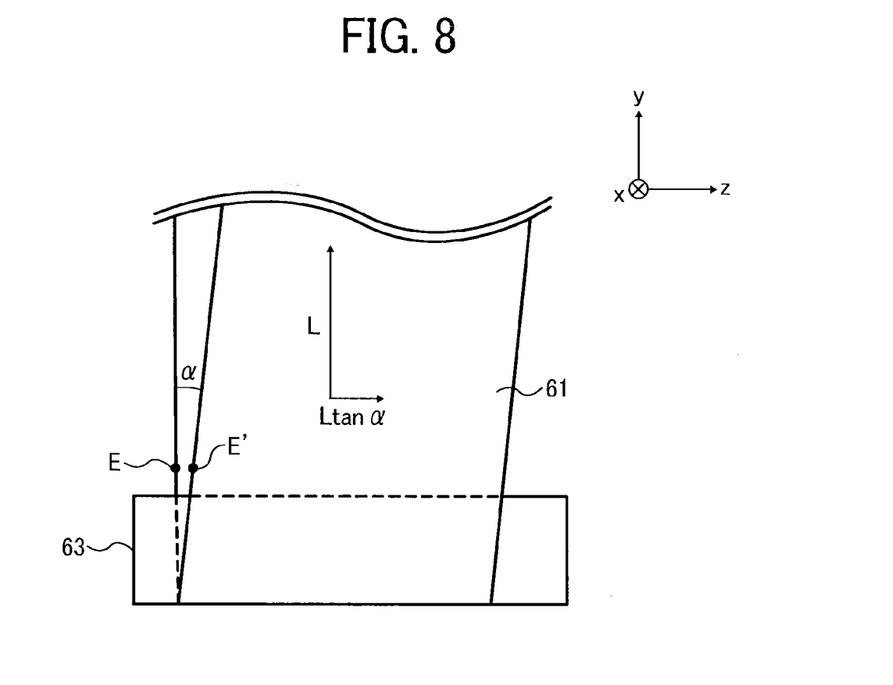
FIG. 8 is a conceptual diagram illustrating an example of misalignment of the secondary transfer belt.

With reference to FIG. 8, a description is provided of a principle of correction of the belt wander by tilting the rotary shaft 63a of the separation roller 63.

FIG. 8 is a conceptual diagram illustrating displacement of the secondary transfer belt 61.

Here, it is assumed that the secondary transfer belt 61 is a rigid body, and an arbitrary point (i.e., a point E on the belt end portion) on the secondary transfer belt 61 before advancing to the separation roller 63 is observed.

It is also assumed that the secondary transfer belt 61 entrained around and stretched taut between the secondary transfer roller 62 and the separation roller 63 is completely horizontal or parallel. In this case, the position of the secondary transfer belt 61 in the axial direction of the separation roller 63 does not change between the point E on the secondary transfer belt 61 immediately before advancing to the separation roller 63 and a point E' corresponding to the point E immediately after exiting the separation roller 63. Therefore, the secondary transfer belt 61 does not wander.

By contrast, in a case in which the rotary shaft 63a of the separation roller 63 is inclined at an inclination angle $\alpha$ relative to the rotary shaft 62a of the secondary transfer roller 62, the point E on the secondary transfer belt 61 moves by an amount of tan $\alpha$ in the axial direction of the separation roller 63 while moving along the peripheral surface of the separation roller 63 as illustrated in FIG. 8.

Therefore, by tilting the rotary shaft 63a of the separation roller 63 at the inclination angle $\alpha$ relative to the rotary shaft 62a of the secondary transfer roller 62, the position of the secondary transfer belt 61 in the width direction of the belt can be moved approximately by the amount tan $\alpha$ in accordance with the rotation of the separation roller 63.

The amount of displacement (travel speed in the width direction of the belt) of the secondary transfer belt 61 is proportional to the inclination angle $\alpha$. The greater is the inclination angle $\alpha$, the greater is the amount of displacement of the secondary transfer belt 61. The smaller is the inclination angle $\alpha$, the smaller is the amount of displacement of the secondary transfer belt 61.

Assuming that the secondary transfer belt 61 travels to the right side in FIG. 7, this belt wander causes the shaft inclining member 72 to move in the axial direction of the separation roller 63, thereby moving the rotary shaft 63a of the separation roller 63 down in FIG. 7 and hence moving the secondary transfer belt 61 back to the left side in FIG. 7.

With this configuration, the displacement of the secondary transfer belt 61 in the opposite direction to the direction of the initial belt wander, attributed to the inclination of the rotary shaft 63a of the separation roller 63, compensates the initial belt wander. In other words, the secondary transfer belt 61 is moved to a place at which the initial belt wander and the displacement of the secondary transfer belt 61 are balanced, thereby correcting the belt misalignment.

In the event in which the secondary transfer belt 61 traveling at the balanced position shifts towards either side, the inclination of the rotary shaft 63a of the separation roller 63 in accordance with the displacement of the belt brings the secondary transfer belt 61 to the balanced position again.

According to the present illustrative embodiment, the shaft moving device 70 of the secondary transfer device 60 tilts the rotary shaft 63a of the separation roller 63 at an inclination angle corresponding to the travel amount of the secondary transfer belt 61 in the width direction of the belt. Displacement of the secondary transfer belt 61 is corrected fast.

Furthermore, in order to tilt the rotary shaft 63a of the separation roller 63, the moving force of the secondary transfer belt 61 traveling in the width direction of the belt is used so that an additional drive source such as a motor is not necessary and hence no space is needed to accommodate the drive source. The rotary shaft 63a of the separation roller 63 can be tilted with a simple configuration without a dedicated drive source. Since no space is needed to accommodate the drive source for tilting the rotary shaft 63a of the separation roller 63, downsizing of the apparatus is achieved.

Figure 9:
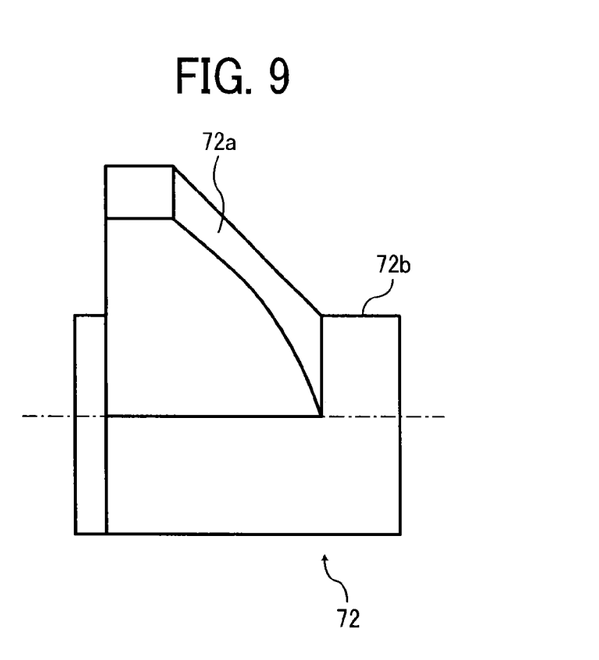
FIG. 9 is a perspective view schematically illustrating a shaft inclining member of the shaft moving device.

Next, with reference to FIG. 9, a description is provided of the shaft inclining member 72. FIG. 9 is a perspective view schematically illustrating the shaft inclining member 72 according to the present illustrative embodiment.

According to the present illustrative embodiment, the shaft inclining member 72 includes the slanted surface 72a on an outer circumferential surface of a cylindrical main body of the shaft inclining member 72. The slanted surface 72a is formed of a curved surface that constitutes a part of the circumference of a conical shape, the center of which coincides with the center axis of the cylindrical main body.

There are two reasons for forming the slanted surface 72a with a curved surface. The first reason is that even when the shaft inclining member 72 rotates slightly around the rotary shaft 63a of the separation roller 63, the angle of inclination of the separation roller 63 does not change. The second reason is that the curved surface allows the shaft inclining member 72 and the contact portion 68a of the frame 68 to make a point contact, thereby reducing friction at the contact place at which the slanted surface 72a and the contact portion 68a contact. With this configuration, the contact pressure at the end portion of the secondary transfer belt 61 contacting the belt deviation detector 71 is reduced, thereby reducing damage to the end portion of the secondary transfer belt 61 and hence achieving extended belt life expectancy.

According to the present illustrative embodiment, the slanted surface 72a is tilted at an inclination angle $\beta$ of approximately 30° relative to the rotary shaft 63a. Material of the shaft inclining member 72 includes, but is not limited to, polyacetal (POM).

A bending stress acts repeatedly on the end portion of the secondary transfer belt 61 due to contact with the belt deviation detector 71, thus resulting in damage or breakage of the secondary transfer belt 61. For this reason, preferably, a reinforcing tape is adhered around the inner and outer circumferential surfaces at the end of the secondary transfer belt 61.

According to the present illustrative embodiment, the movement of the shaft inclining member 72 towards outside in the axial direction is restricted to a certain range. More specifically, an outer end surface 72c of the shaft inclining member 72 in the axial direction comes into contact with a second stopper surface 68c, thereby preventing the shaft inclining member 72 from moving further outside in the axial direction. In the present illustrative embodiment, the second stopper surface 68c of the frame 68 stops the shaft inclining member 72 from moving towards outside in the axial direction. Alternatively, the support arm 64 and the shaft bearing 65 may also restrict the movement of the shaft inclining member 72 toward outside in the axial direction.

With this configuration, the secondary transfer belt 61 does not need a rib attached to the end portion of the secondary transfer belt 61.

When aligning the belt using a rib attached to both ends of the secondary transfer belt, the width of the secondary transfer belt needs to be wide in consideration of the ribs at both end, complicating efforts to achieve downsizing. In order to reduce the material cost for the secondary transfer belt, which is generally expensive, downsizing is also desired.

When the secondary transfer belt 61 passes through the secondary transfer nip, a buckling load is applied to the secondary transfer belt 61 at the edges of the pressured secondary transfer roller 62. In particular, the circumferential length of the secondary transfer belt 61 is shorter than that of the intermediate transfer belt 8. More specifically, the circumferential length of the secondary transfer belt 61 is approximately 300 mm, and the number of times the transfer belt 61 passes through the secondary transfer nip increases. As a result, the buckling load increases load or strain exerted on the secondary transfer belt 61, thereby significantly shortening the product life cycle of the secondary transfer belt 61.

To extend product life of the secondary transfer belt 61, the above-described load needs to be prevented. In view of this, the belt alignment device of the present disclosure is employed so that the width of the secondary transfer belt 61 is less than that of the secondary transfer roller 62, and no buckling load is applied to the secondary transfer belt 61 when passing through the secondary transfer nip. With this configuration, the product life of the secondary transfer belt 61 can be extended.

According to the present illustrative embodiment, the amount of displacement of the secondary transfer belt 61 on one side in the width direction of the belt is adjusted by the shaft inclining member 72 such that the maximum amount of displacement of the secondary transfer belt 61 on one side in the width direction of the belt of the secondary transfer belt 61 to be the same as the width of the slanted surface 72a of the shaft inclining member 72 in the width direction of the belt.

For example, the range within which the shaft inclining member 72 can move towards outside in the axial direction is regulated by the second stopper surface 68c of the frame 68, thereby restricting the range of displacement of the secondary transfer belt 61.

Accordingly, a width X of the slanted surface 72a of the shaft inclining member 72 in the width direction of the belt illustrated in FIG. 1 coincides with the maximum amount of displacement of the secondary transfer belt 61 on one side in the width direction of the belt.

To prevent the secondary transfer belt 61 from running off the secondary transfer roller 62 when the secondary transfer belt 61 shifts to either side in the width direction of the belt, Equation 1 is satisfied.

$$Z > 2X + Y,\qquad\text{[EQUATION 1]}$$

where X is the maximum amount of displacement of the secondary transfer belt 61 on one side, Y is the width of the secondary transfer belt 61 in the width direction of the belt, and Z is the width of the secondary transfer roller 62 in the width direction of the belt. It is to be noted that the width of the secondary transfer belt 61 in the width direction of the belt may also be referred to simply as a secondary transfer belt width, and the width of the secondary transfer roller 62 in the width direction of the belt may also be referred to simply as a secondary transfer roller width.

As Equation 1 is satisfied, the secondary transfer belt 61 has a width with which the secondary transfer belt 61 does not run off the edge of the secondary transfer roller 62 regardless of displacement of the secondary transfer belt 61. With this configuration, the buckling load does not need to be taken into consideration.

The width Y of the secondary transfer belt is set to satisfy Equation 2 below so as to transfer an image from the intermediate transfer belt 8 properly onto a recording medium P borne on the secondary transfer belt 61.

$$Y > A + X,\qquad\text{[EQUATION 2]}$$

where Y is the width of the secondary transfer belt, A is a maximum image formation width of the intermediate transfer belt 8 in the width direction of the belt, and X is the maximum amount of displacement of the secondary transfer belt. The width Y of the secondary transfer belt is set to be greater than a sum of the maximum image formation width A of the intermediate transfer belt 8 in the width direction of the belt on which the image is formed and the maximum amount X of the belt displacement.

With this configuration, even when the secondary transfer belt 61 shifts, the image can be transferred from the intermediate transfer belt 8 onto the recording medium P borne on the secondary transfer belt 61 without exceeding the recording medium P, thus preventing transfer failure.

Figure 10:
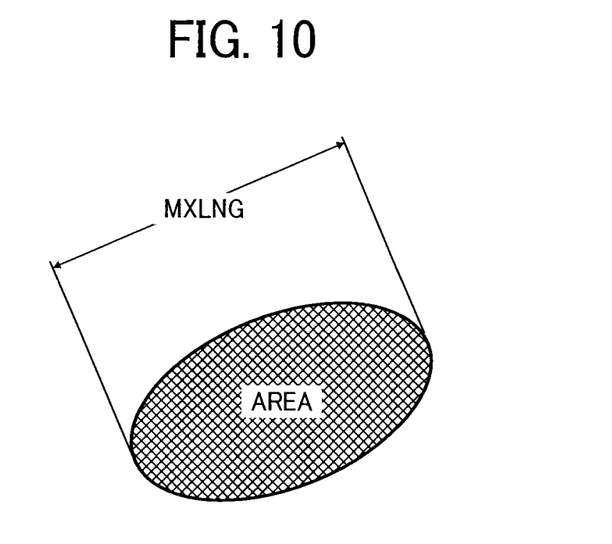
FIG. 10 is a schematic diagram illustrating a toner particle for explaining a shape factor SF-1.
Figure 11:
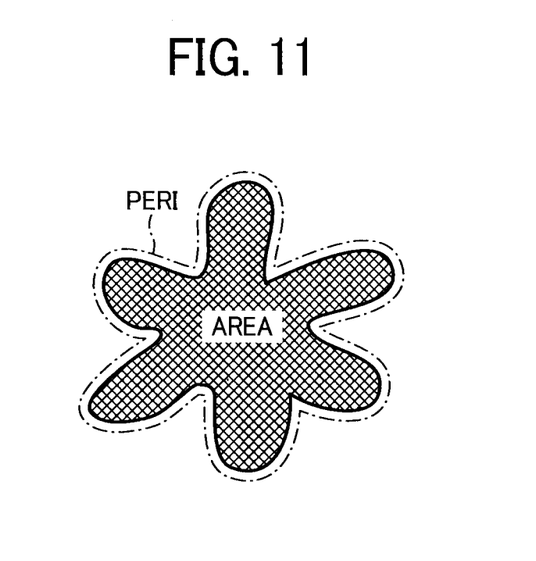
FIG. 11 is a schematic diagram illustrating a toner particle for explaining a shape factor SF-2.

With reference to FIGS. 10 and 11, a description is provided of toner employed in the image forming apparatus of the present illustrative embodiment.

The toner employed in the image forming apparatus is polymerization toner manufactured through the polymerization method. Preferably, the toner preferably has a shape factor SF-1 of 100 to 180 and another shape factor SF-2 of 100 to 180.

FIG. 10 is a schematic view illustrating a shape of toner for explaining the shape factor SF-1. FIG. 11 is a schematic view illustrating a shape of toner for explaining the shape factor SF-2.

The first shape factor SF1 shows a degree of roundness of a toner particle and is expressed by Equation 3. wherein MXLNG represents the maximum diameter of a projected image of a toner particle on a two-dimensional plane and AREA represents the area of the projected image.

$$SF\text{-}1 = \{(LXLNG)^2/AREA\} \times (100\pi/4) \quad \text{[EQUATION 3]}$$

When SF-1 is 100, the toner particle has a true spherical shape. The greater is the SF-1, the more irregular the toner shape.

The second shape factor SF2 shows a degree of roughness of a toner particle and can be expressed by Equation 4. wherein PERI represents the peripheral length of a projected image of a toner particle on a two-dimensional plane and AREA represents the area of the projected image.

$$SF\text{-}2 = \{(PERI)^2/AREA\} \times (100\pi/4) \quad \text{[EQUATION 4]}$$

When SF-2 is 100, the toner particle has a completely smooth surface without roughness. The greater is the SF-2, the rougher is the toner surface.

The shape factors are determined by obtaining a photographic image of toner particles with a scanning electron microscope (S-800 from Hitachi, Ltd.) and analyzing the photographic image with an image analyzer (LUZEX 3 from Nireco Corporation).

When the shape of the toner particle becomes close to a sphere, toner particles contact each other as well as the photosensitive drum in a point contact manner. Consequently, absorbability between the toner particles decreases, resulting in an increase in fluidity. Moreover, absorbability between the toner particles and the photosensitive drum decreases, resulting in an increase in a transfer rate.

When either the shape factor SF-1 or SF-2 exceeds 180, the transfer rate decreases or also cleaning ability decreases when toner is adhered to the transfer device.

Preferably, the volume average particle diameter of a toner particle is in a range of 4 μm to 10 μm. The volume average particle diameter smaller than the above range causes undesirable toner adherence onto the recording medium during development, degradation of fluidity, and coagulation of the toner, hence resulting in toner dropouts or a partial toner transfer failure.

By contrast, the volume average particle diameter larger than the above range causes toner to scatter and degradation of resolution, causing degradation of image quality. According to the present illustrative embodiment, the volume average particle diameter of a toner particle is approximately 6.5 μm.

The above-described image forming apparatus is an example of the image forming apparatus of the present invention. The present invention includes the following embodiments.

[Aspect A]

A belt conveyor unit such as the secondary transfer device 60 includes a belt such as the endless secondary transfer belt 61, a plurality of rollers around which the belt is rotatably entrained, and a belt alignment device. The plurality of rollers includes at least a first roller such as the secondary-transfer opposed roller 12, a second roller such as the secondary transfer roller 62 disposed opposite the first roller via the belt, and a third roller such as the separation roller 63 other than the first roller and the second roller. The belt alignment device includes a shaft moving device to tilt a rotary shaft of the third roller such as the rotary shaft 63a upon receiving a moving force of the belt moving in the width direction of the belt in the axial direction of the rotary shaft, thereby adjusting displacement of the belt within a permissible range. The shaft moving device includes an axial-direction displacement member such as the shaft inclining member 72 disposed at the end of the shaft of the third roller and a fixation member such as the frame 68 to contact the axial-direction displacement member from one side of the axial-direction displacement member in the width direction of the belt. The axial-direction displacement member includes a slanted surface such as the slanted surface 72a that contacts the fixation member and moves to one side in the width direction of the belt along the rotary shaft of the third roller upon receiving the moving force of the belt moving in the width direction of the belt. As the axial-direction displacement member receives the moving force of the belt traveling in the width direction of the belt, thus moving along the slanted surface relative to the fixation member, the end of the rotary shaft of the third roller is displaced and the rotary shaft of the third roller tilts. A maximum amount of belt displacement in the width direction of the belt is adjusted by the axial-direction displacement member such that the maximum amount of belt displacement is substantially the same as the width of the slanted surface in the width direction of the belt. More specifically, the following relation is satisfied: $Z > 2X+Y$, where X is the maximum amount of the belt displacement on one side in the width direction of the belt, Y is the width of the belt in the width direction of the belt, and Z is the width of the second roller in the width direction of the belt.

In Aspect A, as the axial-direction displacement member receives the moving force of the belt traveling in the width direction of the belt, thus moving along the slanted surface relative to the fixation member, the end of the shaft of the third roller moves, thereby tilting the rotary shaft of the third roller. Accordingly, displacement of the belt is corrected. With this configuration, an additional drive source such as a motor or the like to tilt the third roller is not needed, thereby reducing the size of the apparatus.

Furthermore, the amount of displacement of the belt in the width direction of the belt is adjusted by the axial-direction displacement member such that the maximum amount of the belt displacement on one side in the width direction of the belt of the belt is the same as the width of the slanted surface of the axial-direction displacement member in the width direction of the belt. Accordingly, a range of belt displacement can be limited. When the relation of $Z > 2X+Y$ is satisfied, the belt is prevented from running off the edge of the second roller when the belt shifts to either side in the width direction of the belt. Accordingly, even when the belt displacement occurs, the belt is prevented from running off the edge of the second roller, hence preventing application of the buckling load on the belt and extending product life of the belt.

[Aspect B]

According to Aspect A, a circumferential length of the belt in a direction of travel of the belt is equal to or less than 300 mm. With this configuration, even when a belt having a small diameter, which is employed for achieving downsizing and hence susceptible to damage, is employed, the belt is prevented from getting damaged due to the belt wander.

[Aspect C]

An image forming apparatus equipped with an image forming device such as the process unit 6 (6Y, 6M, 6C, and 6K) for forming an image includes the belt conveyor unit of Aspect A or Aspect B. This configuration can enhance the product life of the belt while allowing downsizing of the image forming apparatus as a whole.

[Aspect D]

An image forming apparatus such as a printer includes the belt conveyor unit according to Aspect A or Aspect B as a drive device that drives a recording medium conveyor such as the secondary transfer belt 61 formed into an endless loop entrained rotatably around a plurality of rollers. In the image forming apparatus, an image formed on the image bearing member such as the photosensitive drum 1 is transferred onto a recording medium delivered by the recording medium conveyor. As described above, this configuration can perform good transfer.

[Aspect E]

The image forming apparatus according to Aspect D, the following relation is satisfied: Y>A+X, where A is a maximum image formation width of the image bearing member on which the image is formed in the width direction of the belt. With this configuration, even when the belt 61 runs out of alignment, the image can be transferred from the image bearing member onto the recording medium borne on the belt without exceeding the recording medium, thus preventing transfer failure.

[Aspect F]

The image forming apparatus according to Aspect D or Aspect E, the second roller is electrically grounded. As described above, with this configuration, As the secondary transfer roller 62 is grounded, electrical leakage to surrounding parts and devices due to high voltage is difficult to occur.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A belt conveyor unit, comprising:
   a belt formed into an endless loop;
   a first roller provided outside the loop of the belt;
   a second roller disposed opposite the first roller via the belt;
   a third roller other than the first roller and the second roller, the belt being rotatably entrained around the second and third rollers;
   a belt alignment device including a shaft moving device to tilt a rotary shaft of the third roller upon receiving a moving force of the belt moving in a width direction of the belt in an axial direction of the rotary shaft to adjust displacement of the belt within a permissible range; and
   a support arm positioned at the end of the rotary shaft of the third roller, wherein a groove of the support arm slidably supports therein a shaft bearing that bears the rotary shaft such that the shaft bearing is slidable in a radial direction from a center of rotation of the support arm,
   the shaft moving device including:
   an axial-direction displacement member disposed at an end of the rotary shaft of the third roller to move to a first side in the width direction of the belt along the rotary shaft of the third roller upon receiving the moving force of the belt, the axial-direction displacement member including a slanted surface, and
   a fixation member to contact the slanted surface from the first side in the width direction of the belt,
   wherein as the axial-direction displacement member receives the moving force of the belt moving in the width direction of the belt and moves in accordance with the slanted surface relative to the fixation member, the end of the rotary shaft of the third roller is displaced so as to tilt the rotary shaft of the third roller,
   wherein a maximum amount of belt displacement in the width direction of the belt is adjusted by the axial-direction displacement member such that the maximum amount of belt displacement is substantially the same as a width of the slanted surface in the width direction of the belt, and the following relation is satisfied:

$$Z>2X+Y,$$

where X is the maximum amount of the belt displacement on one side in the width direction of the belt, Y is a width of the belt in the axial direction of the rotary shaft, and Z is a width of the second roller in the width direction of the belt.

2. The belt conveyor unit according to claim 1, wherein a circumferential length of the belt in a direction of travel of the belt is equal to or less than 300 mm.

3. An image forming apparatus, comprising:
   an image bearing belt to bear an image on a surface thereof;
   an image forming device to form the image on the image bearing belt; and
   the belt conveyor unit according to claim 1 to drive the image bearing belt.

4. An image forming apparatus, comprising:
   an image bearing member on which an images is formed;
   a recording-medium conveyor including the plurality of rollers and the belt entrained rotatably around the plurality of rollers, to transport a recording medium onto which the image is transferred from the image bearing member; and
   the belt conveyor unit according to claim 1 to drive the recording-medium conveyor.

5. The image forming apparatus according to claim 4, wherein the following relation is satisfied:

$$Y>A+X,$$

where X is the maximum amount of the belt displacement on one side in the width direction of the belt, Y is the width of the belt, and A is a maximum image formation width of the image bearing member in the width direction of the belt on which the image is formed.

6. The image forming apparatus according to claim 4, wherein the second roller of the belt conveyor unit is electrically grounded.

7. The belt conveyor unit according to claim 1, wherein the shaft bearing is biased by a tension spring in the radial direction.

8. The belt conveyor unit according to claim 1, further comprising a belt deviation detector positioned on the rotary shaft of the third roller.

9. The belt conveyor unit according to claim 8, wherein the belt deviation detector includes a flange that contacts an end portion of the belt.

* * * * *